US012508557B2

(12) United States Patent
Herth et al.

(10) Patent No.: US 12,508,557 B2
(45) Date of Patent: Dec. 30, 2025

(54) METHOD FOR GENERATING A FLOW IN A MICRODROP AND DEVICE FOR IMPLEMENTING THE METHOD

(71) Applicants: UNIVERSITE PARIS-SACLAY, Gif-sur-Yvette (FR); CENTRE NATIONAL DE LA RECHERCHE SCIENTIFIQUE, Paris (FR); UNIVERSITE PARIS CITÉ, Paris (FR); ECOLE NATIONALE SUPERIEURE DE MECANIQUE ET DES MICROTECHNIQUES, Besançon (FR)

(72) Inventors: Etienne Herth, Villeneuve-Saint-Georges (FR); Thomas Baron, Besançon (FR); Philippe Brunet, Paris (FR)

(73) Assignees: UNIVERSITE PARIS-SACLAY, Gif-sur-Yvette (FR); CENTRE NATIONAL DE LA RECHERCHE SCIENTIFIQUE, Paris (FR); UNIVERSITE PARIS CITÉ, Paris (FR); ECOLE NATIONALE SUPERIEURE DE MECANIQUE ET DES MICROTECHNIQUES, Besançon (FR)

(*) Notice: Subject to any disclaimer, the term of this patent is extended or adjusted under 35 U.S.C. 154(b) by 644 days.

(21) Appl. No.: 17/995,010

(22) PCT Filed: Mar. 11, 2021

(86) PCT No.: PCT/EP2021/056153
§ 371 (c)(1),
(2) Date: Sep. 29, 2022

(87) PCT Pub. No.: WO2021/197790
PCT Pub. Date: Oct. 7, 2021

(65) Prior Publication Data

US 2023/0211300 A1 Jul. 6, 2023

(30) Foreign Application Priority Data

Apr. 3, 2020 (FR) ....................................... 2003336

(51) Int. Cl.
*B01F 31/86* (2022.01)
*B01F 33/302* (2022.01)

(52) U.S. Cl.
CPC .......... *B01F 31/86* (2022.01); *B01F 33/3021* (2022.01); *B01F 2215/0445* (2013.01)

(58) Field of Classification Search
CPC .. B01F 31/80; B01F 31/87; B01F 2215/0454; B01F 31/86; B01J 19/10;
(Continued)

(56) References Cited

U.S. PATENT DOCUMENTS 7,942,568 B1 * 5/2011 Branch .................. B01F 31/86 366/127
9,096,823 B1 * 8/2015 Branch ................. B01L 3/5027
(Continued)

FOREIGN PATENT DOCUMENTS

CN 109126918 A * 1/2019 .......... B01L 3/50273
DE 19611270 A1 9/1997
WO 2006027602 A1 3/2006

OTHER PUBLICATIONS

D. Johannsmann (2015). The Quartz Crystal Microbalance in Soft Matter Research, Soft and Biological Matter. Springer International Publishing. DOI: 10.1007/978-3-319-07836-6_1 (Year: 2015).*
(Continued)

*Primary Examiner* — Claire X Wang
*Assistant Examiner* — Patrick M Mccarty
(74) *Attorney, Agent, or Firm* — Greer, Burns & Crain, Ltd

(57) ABSTRACT

A method for generating a stirring in a fluid microdrop, the volume of which is preferably greater than several tens of nanolitres, using an actuator device comprising a high-overtone bulk acoustic resonator HBAR having a quality factor Q of at least 100 in air and including a support which is substantially flat and coated with a layer of dielectric material. The HBAR resonator is associated with a modulatable electronic device capable of generating high-frequency waves. The method envisages depositing, on the support, a fluid microdrop, generating a sinusoidal electrical signal by controlling the modulatable electronic device at a chosen frequency, the frequency being between 100 MHz and 4 GHz, and transformation of the sinusoidal electrical signal having the chosen frequency into high-frequency acoustic waves (OA) by the HBAR resonator.

14 Claims, 5 Drawing Sheets

(58) Field of Classification Search
CPC ..... B01L 2400/0433; B01L 2400/0436; B01L 2400/0496; G01N 2015/142
See application file for complete search history.

(56) References Cited

U.S. PATENT DOCUMENTS 9,375,690 B2* 6/2016 Wilson .............. B01L 3/502792
2002/0009015 A1 1/2002 Laugharn, Jr. et al.
2004/0115097 A1* 6/2004 Wixforth .......... B01F 35/71815 436/180
2007/0040473 A1 2/2007 Ballandras et al.
2008/0170463 A1* 7/2008 Murakami .............. B01F 31/87 366/110
2008/0247264 A1* 10/2008 Gabl ................... B01L 3/50273 366/127
2009/0206171 A1 8/2009 Friend et al.
2012/0028293 A1 2/2012 Wixforth et al.
2012/0145667 A1* 6/2012 Imbert ..................... H03H 3/08 156/289
2012/0298205 A1* 11/2012 Schertzer .......... B01L 3/502707 204/601
2021/0247291 A1* 8/2021 Wuite .................. G01N 29/032

OTHER PUBLICATIONS

Zhang, H., Pang, W., & Kim, E. S. (Aug. 2005). High-frequency bulk acoustic resonant microbalances in liquid. In Proceedings of the 2005 IEEE International Frequency Control Symposium and Exposition, 2005. (pp. 5-pp). IEEE. (Year: 2005).*

Cui, W. Pang, W. Yang. Y., Li, T., Duan, X. (2019). Theoretical and experimental characterizations of gigahertz acoustic streaming in microscale fluids, Nanotechnology and Precision Engineering, 2(1), pp. 15-22. (Year: 2019).*

Ballandras, S., Baron, T., Lebrasseur, E., Martin, G., Gachon, D., Reinhardt, A., . . . & Rabus, D. (Apr. 2012). High overtone Bulk Acoustic Resonators: application to resonators, filters and sensors. In Acoustics 2012. (Year: 2012).*

Zhang, H., Jiang, G. Z., Liu, Z. Q., Zhang, S. Y., & Fan, L. (2014). Optimizations of composited acoustic sensors with a microfluidic channel. Journal of Applied Physics, 115(13). (Year: 2014).*

International Search Report and Written Opinion received for PCT/EP2021/056153, mailed Jun. 14, 2021.

French Search Report received for Application No. 2003336, dated Dec. 7, 2020.

* cited by examiner

METHOD FOR GENERATING A FLOW IN A MICRODROP AND DEVICE FOR IMPLEMENTING THE METHOD

BACKGROUND

The invention relates to the field of the manipulation and processing of fluids on a droplet scale, such as the manipulation, mixing and/or preparation of samples in microfluidics.

The invention relates more particularly to a method which makes it possible to generate a flow in a microdrop of fluid product, i.e. which makes it possible to generate movement in the microdrop in order to mix (or more generally agitate) the particles contained therein.

By "microdrop", "droplet" or "small-volume" drop is meant a drop of fluid the volume of which is of the order of one microlitre or a few microlitres.

The word "fluid" denotes a liquid, an emulsion or a colloidal solution.

The invention makes it possible to intensify chemical and biochemical reactions and/or produce micromixtures inside a microdrop.

The invention is particularly applicable in the manipulation of infinitesimal quantities of fluid, in particular in a laboratory in the field of biotechnology, for example for new generation sequencing (NGS).

The fluids to be manipulated can be pure substances or mixtures of substances. They can also be fluids containing microparticles in suspension that must be subjected to targeted subsequent processing in the fields of chemical analysis, medical technology and biotechnology.

The emergence of miniaturized systems using conventional microelectromechanical systems (MEMS) technology was an important step in the development of medical devices, sensors or other microelectronic devices.

Some applications make it necessary to mix together small quantities of fluids (of the order of one microlitre or a few microlitres) or to move, mix, particles contained in a microdrop of sampled product, for example.

It is currently known practice to generate and manipulate, in parallel and automatically, droplets in microchannels of laboratory devices (for example of the lab-on-a-chip type). It is also known practice to carry out biochemical reactions within microdroplets. These techniques have inspired the development of multi-purpose platforms for a number of applications ranging from molecular diagnostics to organic synthesis.

In the known devices, the droplet acts as a miniaturized reaction site, with precise control of the stoichiometric conditions.

This approach enables the controlled manipulation of small volumes of the reaction mixtures and enables the separation or rapid mixing of molecules of complex samples, facilitating analysis.

The possibility of generating droplets at a very high flow rate (a frequency of 100 kHz to a few hundred MHz) facilitates experiments that were previously impossible due to the practical constraint on the number of reactions that can be carried out using conventional lab bench technologies.

However, one problem encountered when manipulating small volumes of fluid consists of effectively mixing together different fluids: due to the confinement, the flows in a microdrop are essentially governed by the viscous stresses and surface tension forces of the microdrop. The mixing of droplets can thus be very limited in microfluidic devices (100 μL or less).

In some cases, it is desirable to add a small volume of reagent to a droplet of sample in order to facilitate the analysis thereof without substantially diluting it. In such cases, it is difficult to mix the sample and the reagent as the flows in the droplet of sample are too weak.

There is therefore a need for a technique making it possible to produce a satisfactory mixture, i.e. a mixture in which it would no longer be possible to distinguish between the sample and the reagent product.

DE 196 11 270 discloses an apparatus (a micromixer) comprising a microinjection pump and a plurality of inlet channels into which the microdrops of fluids to be mixed or processed are introduced, as well as an outlet opening of the apparatus through which a microdrop of mixed fluids is ejected.

US 2002/0009015 also discloses a device comprising microchannels in each of which a microdrop to be processed can be placed. A transducer, placed near the microdrop, makes it possible to generate sound waves promoting movement of the fluid in the droplet contained in a microchannel.

Such a device does not make it possible to control the flow inside the droplet.

United States Patent Application 20120028293 also discloses a device for mixing in a small quantity of fluid in the form of a drop placed on a piezoelectric substrate, on which interdigitated comb electrodes are supplied with power at a frequency of the order of a few MHz.

Nevertheless, this device has two limitations that come into play: the limitation of the devices to operating frequencies of less than 100 MHz, and the requirement that the process be carried out with a piezoelectric substrate on which metal electrodes must be produced using costly devices.

United States Patent Application 20090206171 also discloses a device for concentration, resuspension and mixing in a small quantity of fluid in the form of a drop placed on a piezoelectric substrate, on which interdigitated comb electrodes are supplied with power at a frequency of the order of 10 to 1,000 MHz.

In addition, the devices described in such documents are unsatisfactory as either to they are too complex to implement or they do not allow easy retrieval of the processed microdrop.

SUMMARY

The invention relates to a method that overcomes the aforementioned drawbacks and to this end relates to a method for generating agitation in a microdrop of fluid the volume of which is preferably greater than a few tens of nanolitres, implementing an actuation device using sound waves, said actuation device comprising a support on and from which said microdrop of fluid is deposited and removed, and a resonator suitable for converting an electrical sine-wave signal applied at its terminals into sound waves.

According to the invention, said method is noteworthy in that the resonator of the actuation device implemented is of the high overtone bulk acoustic resonator (HBAR) type, the HBAR having a quality factor Q of at least 100 in air and containing said support, said support being substantially flat and coated with a layer of dielectric material, in that said resonator is associated with a modulable electronic device suitable for generating said high-frequency waves, and in that it contains the following steps:

depositing a microdrop of fluid on said support, generating an electrical sine-wave signal by controlling the electronic device, said generated electrical sine-wave signal having a frequency selected using the modulable electronic device, said frequency being comprised between 100 MHz and 4 GHz, converting the sine-wave signal having said selected frequency into high-frequency sound waves using said resonator, the high-frequency waves having a natural resonance generating a given agitation in the microdrop.

Carried out in this way, the method according to the invention makes it possible to generate particular flows that can be selected. In fact, the HBAR enables the user to select a frequency from a panel of frequencies, unlike the resonators implemented in the current solutions: the solution according to the invention thus makes it possible to select the appropriate flow for the variety of fluid being processed, as each frequency generates a particular flow.

In addition, it is possible to retrieve the processed microdrop fairly easily as the microdrop only has little contact with support of the device implemented in the method according to the invention: due to the presence of the surface treatment layer of the HBAR, there is only slight adhesion between the microdrop of fluid and the support and the microdrop can simply be removed after processing.

The method according to the invention can also comprise the following features, taken individually or in combination:

the quality factor Q of the HBAR is preferably approximately at least 1,000 in air, the actuation device can be encapsulated in said layer of dielectric material, said layer of dielectric material can be hydrophobic: by "hydrophobic" is meant the quality of a material to repel a fluid containing water, as it does not have the capacity to form hydrogen bonds with the water molecules. The hydrophobic nature of a material with respect to a fluid containing water is defined by a characteristic contact angle. This angle measured between the surface of the hydrophobic material and the tangent to the surface of the drop of fluid at the point of contact with the surface of the material is greater than 90° (measured with a Kruss DSA100 goniometer, for example).

The hydrophobic nature of the support makes it possible to retrieve the microdrop of fluid easily by capillary action after the agitation has been generated.

The hydrophobic nature of the support also makes it possible to reduce the contact area between the microdrop to be processed and the support on which it is resting, which limits the temperature increase of the microdrop and the evaporation thereof when it receives the high-frequency sound waves. The hydrophobic nature of the support of the microdrop to be treated thus makes the implementation of the method according to the invention durable.

said layer of dielectric material can contain poly-para-xylylene, said layer of dielectric material can have a thickness comprised between approximately 100 nm and 40 μm, preferably between 2.5 μm and 10 μm, the frequency of the electrical sine-wave signal generated by the modulable electronic device can be selected before the microdrop is deposited on the support by measuring the quality factor Q in air of said actuation device obtained by varying the frequency of the sine-wave signal and retaining the frequency that makes it possible to obtain the highest quality factor Q in air, the frequency selected can be comprised between 400 MHz and 1 GHz, said microdrop can have a volume of at least approximately 1 μL.

The invention also relates to an actuation device for implementing the method as defined above, comprising a support on and from which said microdrop of fluid can be deposited and removed, and a resonator suitable for converting an electrical sine-wave signal applied at its terminals into sound waves, said resonator being designed to be associated with a modulable electronic device suitable for generating said high-frequency waves. The actuation device is noteworthy in that said resonator is of the high overtone bulk acoustic resonator (HBAR) type and has a quality factor Q of at least 100 in air, and in that said resonator contains said support, said support being substantially flat and coated with a layer of dielectric material.

The actuation device can also contain the following features, taken individually or in combination:

said HBAR can have a quality factor Q of preferably at least approximately 1,000 in air, the device can be encapsulated in said layer of dielectric material, said layer of dielectric material can be hydrophobic, said layer of dielectric material can contain poly-para-xylylene, said layer of dielectric material has a thickness comprised between approximately 100 nm and 40 μm, preferably between 2.5 μm and 10 μm.

BRIEF DESCRIPTION OF THE DRAWINGS

The invention will be more clearly understood in light of an embodiment that will now be presented with reference to the attached drawings, in which.

DETAILED DESCRIPTION

Figure 1:
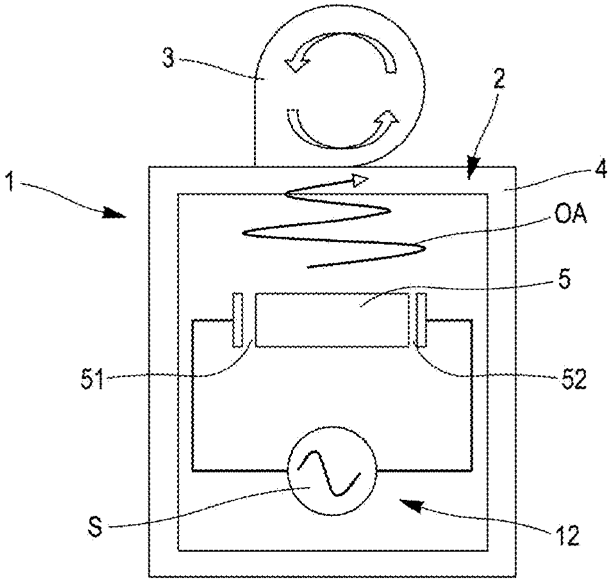
FIG. 1 is a diagrammatic representation of a device according to the invention, enabling the implementation of the method according to the invention.

FIG. 1 shows a device according to the invention, which enables the implementation of the method according to the invention.

Firstly, a device according to the invention will be described with reference to FIGS. 1 and 2.

Reference will then be made to the method according to the invention and to the results obtained with reference to FIGS. 3 to 8.

FIG. 1 shows an actuation device 1 making it possible to generate agitation in a microdrop of fluid.

In the examples described, the microdrops have a volume that varies from 10 μL to 60 μL: the volume of the microdrops to which the method applies is thus greater than a few tens of nanolitres.

The actuation device makes it possible to generate agitation in a microdrop of fluid through the generation of sound waves.

The actuation device 1 contains a support 2 on which a microdrop 3 is deposited.

The support 2 is substantially flat in order to facilitate the depositing and removal of the microdrop with a micropipette (micropipette not illustrated) or co-integrated with a microfluidic system. In fact, it is easier to deposit and retrieve a microdrop on and from a flat support than on and from a support that is concave or has side walls.

The support 2 contains a layer of hydrophobic dielectric material 4: in this way, the microdrop deposited on the support does not spread out on it and can be removed after agitation. Contact between the microdrop 3 and the support is then reduced.

More specifically, the layer of dielectric material 4 contains poly-para-xylylene, more commonly known as parylene.

Parylene is a polymer that takes the form of a film deposited on a support using a vacuum deposition technique, after evaporation and conversion of its precursor.

Parylene has the advantage of being optically transparent and an electrical insulator.

It also has the specific feature that it is deposited by chemical deposition compliant and compatible with MEMS manufacturing technology.

Here, parylene is used to encapsulate a microelectronic system of the coupled-mode HBAR type, which makes it possible to insulate and seal it and protect it from mould and other natural degradation that could adversely affect its performance.

Parylene also makes it possible to protect a resonator that the actuation device (which will be described below) contains from a reaction volume, and vice versa. Finally, it ensures the transmission of sound waves, which are the source of the generation of the agitation (or flow) in the microdrop.

The device thus also contains a resonator 5 that ensures the generation of sound waves.

More specifically, the resonator 5 is a resonator of the high overtone bulk acoustic resonator (HBAR) type: this resonator is capable of converting an electrical sine-wave signal S applied at its terminals 51 and 52 into sound waves OA.

Figure 2:
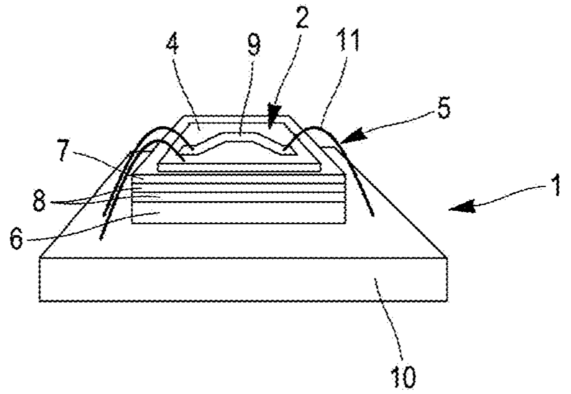
FIG. 2 illustrates part of the device according to the invention, shown in perspective, thus showing a first configuration of the device according to the invention.

Part of the HBAR 5 is illustrated in more detail in FIG. 2. This FIG. 2 illustrates a first configuration of the device according to the invention. This part of the resonator contains a piezoelectric transducer having a quality factor of at least 1,000 in air, and it is made from the following elements:

- A first layer 6 of a piezoelectric material (quartz, LiNBO3, GaAs, LiTaO3, etc.) or a non-piezoelectric material (for example: silicon, sapphire, glass, etc.),
- A second layer 7 of piezoelectric material (LiNBO3, ZnO, ALN, etc.),
- Two conductive layers forming a single layer 8, which forms an electrode sandwiched between the layers 6 and 7,
- Two electrodes 9 and an earth are positioned on the second layer 7 (dual port),
- And a printed circuit board (PCB) 10.

The electrodes 9 are connected to the printed circuit board (PCB) 10 via conductive connections 11 (or connectors).

All of the elements of the HBAR 5 situated on top of the PCB are approximately 2 mm wide and approximately 2 mm long.

The active area, which forms the support 2 on which a microdrop of fluid can be placed, is equivalent to 1 $mm^2$. It can also be smaller.

The active area can be dimensioned as a function of the volume of liquid and/or of to the microfluidic system.

The size of the electrodes is dimensioned so as to be suitable for an electrical impedance of 50 ohms, and also depends on the frequency band.

It is to be noted that the larger the electrode area, the greater the risk of loss of quality factor.

The quality factor depends on the surface condition and surface parallelism.

However, the working area can be adjusted as a function of the volume of the microdrop.

According to a first embodiment, the electrodes and the earth are connected to the printed circuit board (PCB) 10 via the conductive connections 11 as shown in FIG. 2. This embodiment of a device according to the invention makes it possible to operate using one port (reflection measurement) and/or two ports (transmission measurement). The microdrop is then deposited on the aluminium electrode (forming the support 2).

Figure 3:
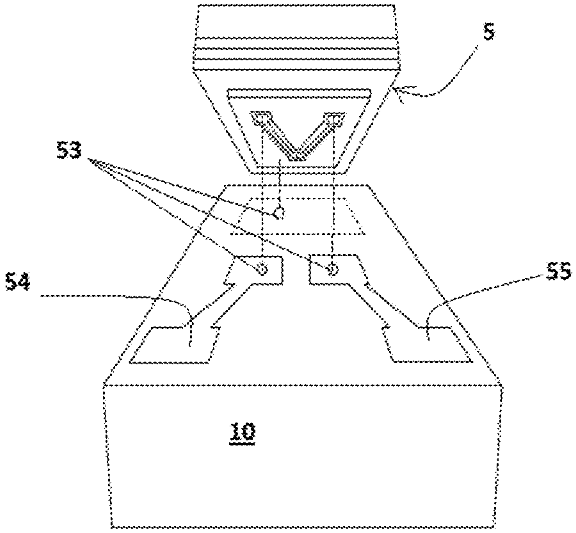
FIG. 3 illustrates the part of the device shown in FIG. 2, associated with another part of the device according to the invention, shown in perspective, thus showing a second configuration of the device according to the invention.

The embodiment of another device according to the invention, shown in FIG. 3, makes it possible to operate using one and/or two ports: according to this embodiment, the part of the HBAR 5 is turned over in order to be fastened (using conductive balls 53) to the PCB 10, which has two ports 54 and 55.

This embodiment therefore makes it possible to operate using one and/or two ports, which makes it possible in particular to carry out reflection and/or transmission measurements.

More specifically, the port 54 (or the port 55) makes it possible to determine the reflection coefficient of the resonator and the ports 54 and 55 make it possible to determine the transmission coefficient of the resonator.

With this type of device, the electrode 8 situated between the piezoelectric layer and the substrate can either be used at a reference potential or remain at a floating potential.

This type of device is doubtless more complex to produce (as it requires additional steps), but it makes it possible to increase the quality factor tenfold.

Within the framework of this embodiment, first configuration, the microdrop is placed on the part constituted by the piezoelectric layer 7 and the layer of hydrophobic dielectric material 4.

Within the framework of the second configuration shown in FIG. 3, the microdrop to is placed on the part constituted by quartz 6 coated with the dielectric layer 4 (hydrophobic material), i.e. on top of the upper part of the assembly illustrated in FIG. 3.

The advantage of implementing two configurations is that it makes it possible to manipulate liquids regardless of the nature thereof (e.g.: liquids with a low and/or high dielectric constant).

The advantage of implementing an HBAR is that it makes it possible to convert waves at several frequencies ranging from 100 MHz to 4 GHz, unlike other forms of transducer, which are only operational at a single frequency.

In other words, by using the HBAR 5, it is possible to select the frequency of the waves received and converted into sound waves in order to generate agitation in the microdrop, wherein this selection is not possible with the other transducers.

This ability to operate at high frequencies enables optimum dissipation of the sound energy. In fact, according to R. T. Beyer, Nonlinear Acoustics (Acoustical Society of America, New York, 1997), the dissipation length in pure water of the sound wave generated is 4 mm at 100 MHz and 40 microns at 1 GHz. In the frequency range of the HBAR device, this attenuation length is thus of the same order as or smaller than the typical size of a drop, enabling optimum energy transfer between the wave and the fluid.

As stated above, the sound waves are emitted via the HBAR from high-frequency waves transmitted to it via a modulable electronic device 12.

This transmission device is shown symbolically in FIG. 1 in the lower part of the device.

Although it is not shown in FIG. 2 (for reasons of clarity of the figure), the resonator 5 is entirely coated in a layer of parylene having a thickness that can be comprised between 100 nm and 15 µm.

Preferably, the thickness of the parylene layer 4 is comprised between 2.5 µm and 10 µm.

The thickness of the parylene layer affects the value of the quality factor of the device according to the invention: it is thus determined based on the expected performance of the device produced according to the invention.

Figure 9:
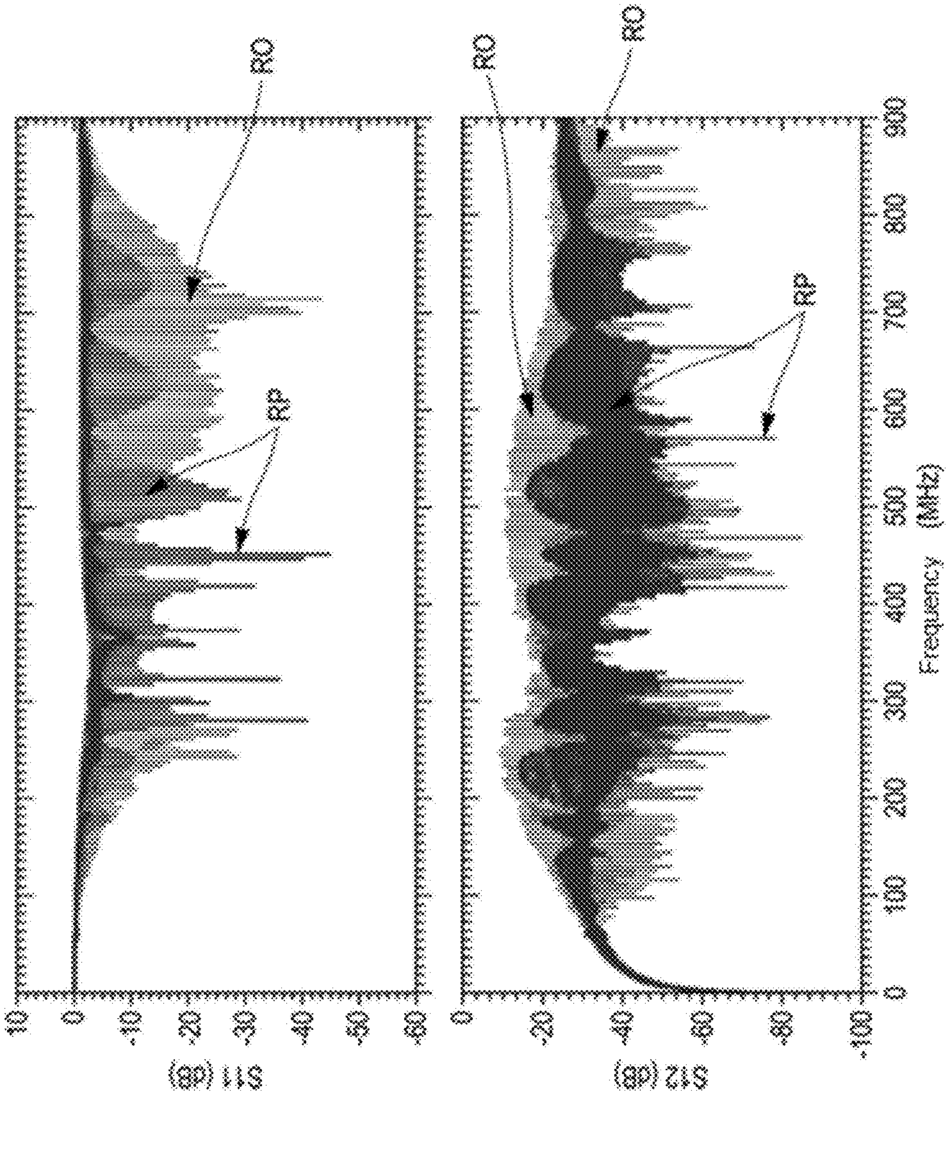
FIG. 9 is a double diagram illustrating the measurements of the reflection coefficient S11 and the transmission coefficient S12 of the HBAR, with parylene RP and without parylene R0 as a function of the frequency.

FIG. 9 compares the effects of the presence or absence of a parylene layer on the to HBAR 5 on the reflection coefficient S11 and the transmission coefficient S12 of the HBAR:

The line R0 is the one obtained for the HBAR 5 without a parylene layer, while the line RP is the one obtained for the parylene-coated HBAR 5.

Multiple resonances were measured in a very wide band which corresponds to the values of the measured reflection and transmission coefficients of the HBAR 5 in a frequency range of from 100 KHz to 900 MHz.

The parylene-coated HBAR 5 (RP) has a weaker electrical signal than the non-parylene-coated one (R0).

According to the invention, it is observed that the resonator 5 designed in this way and coated with a layer of parylene has a quality factor in air of at least 500 (see FIG. 8): the points labelled "0" on the diagram indicate a quality factor of at least 1,200 for applied frequencies ranging from 490 to 550 MHz.

Preferably, the HBAR has a quality factor of 2,000 in air.

Figure 8:
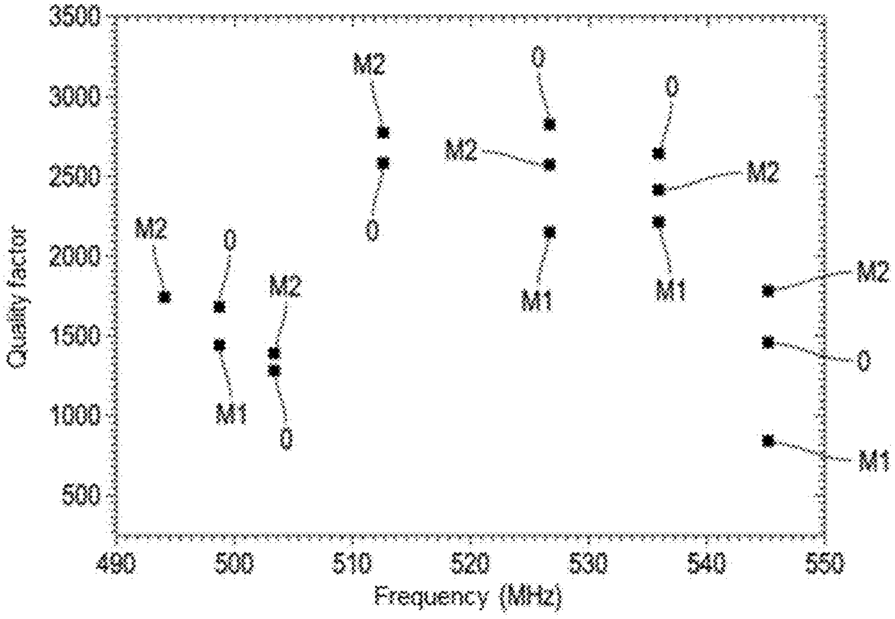
FIG. 8 is a diagram illustrating the quality factor obtained with the device according to the second configuration of the invention when there is no microdrop on the support and when a 10 μL or 60 μL microdrop is positioned on the support of the device, at different frequencies.

Thus, with reference to the diagram in FIG. 8, the parylene-coated HBAR will preferably be implemented at a frequency comprised between 510 and 540 MHz (see the quality factors in excess of 2,500 in air for the resonators labelled "0"—resonators the quality factors of which were tested without a microdrop on the support).

Reference will now be made to the method for implementing the device described above, according to the invention.

As has been explained, the method aims to generate agitation in a microdrop in order to ensure the mixing of the particles in the microdrop without contact or pressure on the microdrop.

Firstly, the frequency of the sine-wave signal selected to create the agitation should be determined.

To this end, the size of the microdrop in which the agitation will be created can be important: in fact, the quality factor of the HBAR 5 is also modified depending on the size of the microdrop.

Figure 7:
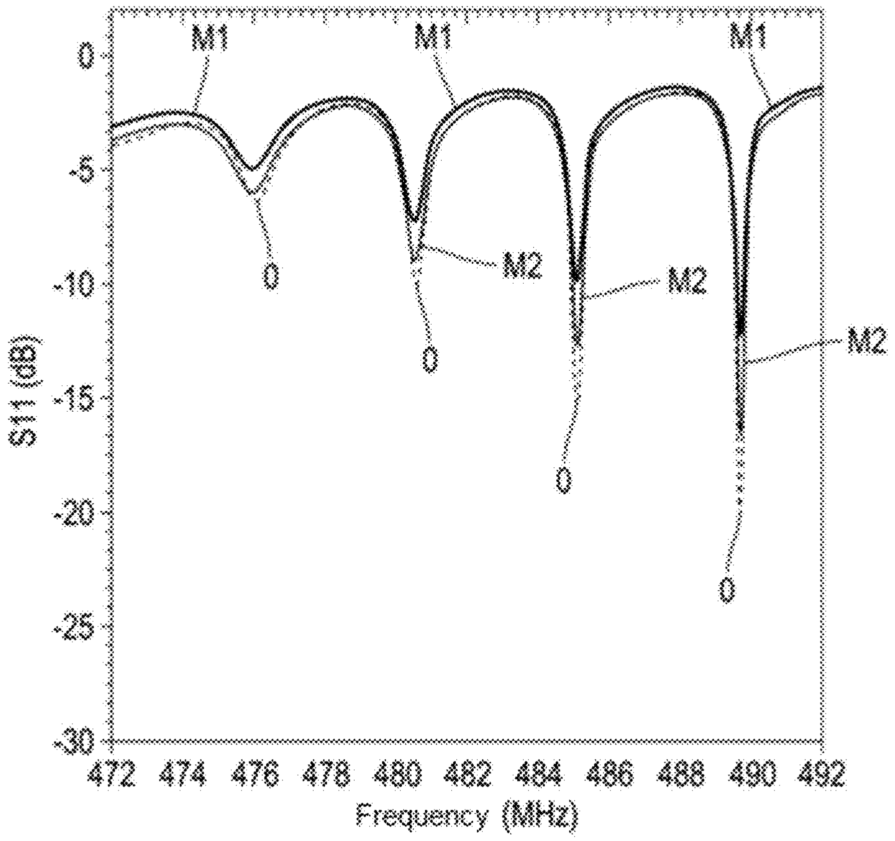
FIG. 7 is a diagram showing the change in the reflection coefficient S11 (in dB) as a function of the volume of the microdrop deposited on the surface of the support of the actuation device according to the second configuration of the invention, the support to being coated with a layer of parylene.

FIG. 7 shows that the microdrops M1 with a volume of approximately 60 µL change the quality factor of the HBAR 5 differently compared with the microdrops M2 with a volume of approximately 10 µL. The label 0 indicates that the measurement was taken without a microdrop.

For the implementation of the device, the device is thus tested, prior to its implementation with a microdrop, at different frequencies, by modulating (changing) the high-frequency waves sent to the HBAR 5 by the modulable electronic device. The quality factors obtained at these different frequencies are measured in parallel.

The frequency retained (or selected) for the implementation of the device is the frequency that makes it possible to obtain the best quality factor, i.e. the highest quality factor.

A microdrop of fluid is deposited on the support 2 with a micropipette.

The volume of the microdrop of fluid is therefore 10 µL for M2 and 60 µL for M1, for example.

The modulable electronic device is then controlled so that it generates an electrical sine-wave signal at the selected frequency.

This signal is transmitted to the HBAR 5, which converts it into high-frequency sound waves. The high-frequency sound waves then have a resonance capable of generating agitation in the microdrop.

Figure 4:
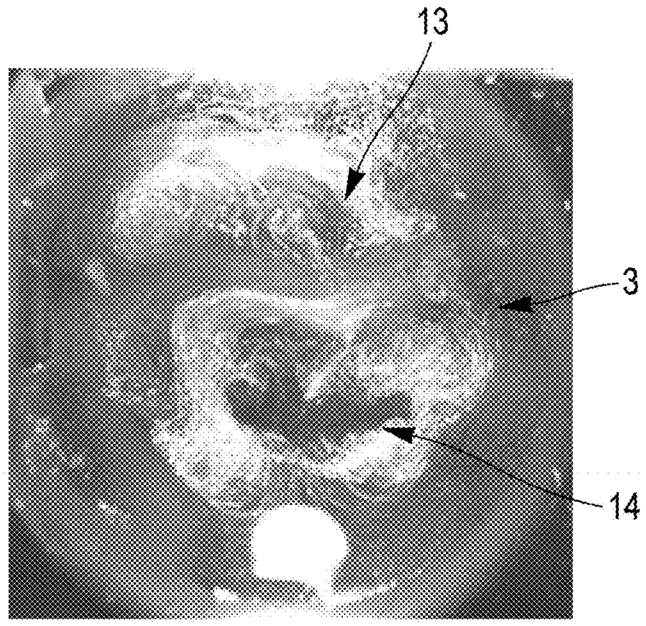
FIG. 4 is a photograph illustrating an example of a first form of agitation obtained using the method according to the invention at 252 MHz.

FIG. 4 is a photograph of agitation obtained in a 60 µL microdrop 3 with a frequency of 252 MHz (5 dBm): it is noted that, in the microdrop, the resonance causes two areas of agitation 13 and 14 of different forms, approximately in the centre of the microdrop 3.

By changing the selected frequency using the modulable electronic device 12, different forms of agitation can be obtained.

Figure 5:
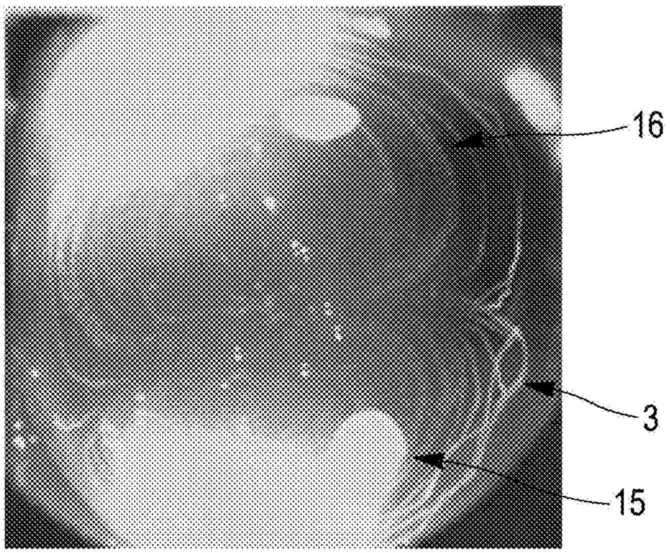
FIG. 5 is a photograph illustrating an example of a second form of agitation obtained using the method according to the invention at 144 MHz.

For example, FIG. 5 is a photograph illustrating another form of agitation in the 60 µL microdrop 3, obtained by changing the selected frequency emitted by the electronic device 12 to 144 MHz (5 dBm): two instances of swirling agitation 15 and 16 are formed starting approximately from a mid-plane of the microdrop towards the inner edges of the microdrop 3.

Figure 6:
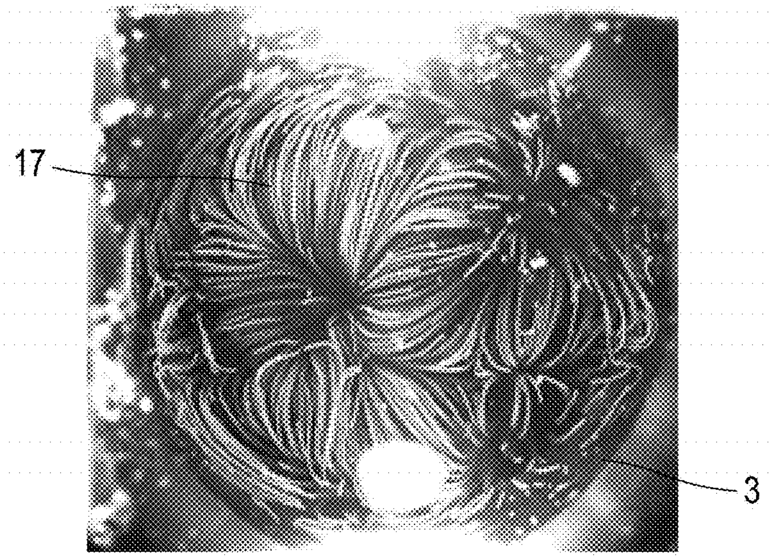
FIG. 6 is a photograph illustrating another example of a form of agitation obtained using the method according to the invention at 425 MHz.

Another form of agitation is shown in the photograph in FIG. 6: it is obtained at a frequency of 425 MHz (5 dBm). Here, a number of whorls 17 of the swirling particles have formed in the entire 60 µL microdrop 3.

It will be understood from the description above how the device according to the invention and its implementation according to the method according to the invention make it possible to generate and combine several types of agitation in microdrops of fluid without having to manipulate the microdrops together.

It should however be understood that the examples given below do not limit the invention: in particular, the device could be implemented with different volumes of microdrops and the method could be implemented at different frequency ranges from those shown in the diagrams.

Such a device according to the invention enables optimum mixing of fluid with one or more reagents, without using an external mixer in contact with the environment of the liquid. In addition, the invention promotes good thermal conductivity (use of quartz/silicon substrates), low injected power (around 1 mW to 1 W) and minimized temperature gradients in the mixed system.

It is to be noted that the device can be produced with dimensions such that it is not very bulky: whereas the known resonators of the SAW type (operating at 434 MHz) can be produced on a quartz substrate occupying an area of around 6 to 10 $mm^2$, the HBAR 5 of the device according to the invention only requires one tenth of this area at the same frequency.

Finally, if a lower quality factor is observed for the HBAR, it is possible to increase the power of the signal. However, in this implementation case there is a risk of a temperature increase (caused by the power increase) that can cause the microdrop to evaporate over time.

The invention claimed is:

1. A method for generating agitation in a microdrop of fluid, the volume of which is greater than a few tens of nanolitres, said method including: implementing an actuation device using sound waves, said actuation device comprising a support on and from which said microdrop of fluid is deposited and removed, and a resonator suitable for converting an electrical sine-wave signal applied at its terminals into sound waves, the method further including wherein:

the resonator of the actuation device implemented is a high overtone bulk acoustic resonator (HBAR), the HBAR having a quality factor Q of at least 100 in air and containing said support, said support being flat and coated with a layer of dielectric material;

said HBAR is associated with a modulable electronic device suitable for generating high-frequency waves;

and the method includes the following steps:

depositing the microdrop of fluid on said support;

generating an electrical sine-wave signal(S) by controlling the modulable electronic device, said generated electrical sine-wave signal(S) having a frequency selected using the modulable electronic device, wherein said frequency is greater than or equal to 100 MHz and less than or equal to 4 GHz; and converting the electrical sine-wave signal(S) having said selected frequency into high-frequency sound waves (OA) using said HBAR, the high-frequency sound waves (OA) having a natural resonance generating a given agitation in the microdrop of fluid.

2. The method according to claim 1, characterized in that the quality factor Q of the HBAR is approximately at least 1,000 in air.

3. The method according to claim 1, characterized in that the actuation device is encapsulated in said layer of dielectric material.

4. The method according to claim 1, characterized in that said layer of dielectric material has a thickness greater than or equal to 100 nm and less than or equal to 40 μm.

5. The method according to claim 1, characterized in that the frequency of the electrical sine-wave signal(S) generated by the modulable electronic device is selected before the microdrop of fluid is deposited on the support by measuring the quality factor Q in air of said HBAR obtained by varying the frequency of the electrical sine-wave signal(S) and retaining the frequency that makes it possible to obtain the highest quality factor Q in air.

6. The method according to claim 1, characterized in that the selected frequency is greater than or equal to 400 MHz and less than or equal to 1 GHz.

7. The method according to claim 1, characterized in that said microdrop of fluid has a volume of at least 1 μL.

8. The method according to claim 1, characterized in that said layer of dielectric material is hydrophobic.

9. The method according to claim 8, characterized in that said layer of dielectric material contains poly-para-xylylene.

10. An actuation device using sound waves, for implementing the method according to claim 1, comprising: a support on and from which said microdrop of fluid can be deposited and removed; a modulable electronic device suitable for generating high-frequency waves and a resonator suitable for converting an electrical sine-wave signal(S) applied at its terminals into sound waves (OA); said resonator being designed to be associated with the modulable electronic device suitable for generating high-frequency waves, wherein said resonator is a high overtone bulk acoustic resonator (HBAR) and has a quality factor Q of at least 100 in air and said HBAR includes said support; said support being flat and coated with a layer of dielectric material, said layer of dielectric material contains poly-para-xylylene.

11. The actuation device according to claim 10, characterized in that said HBAR has the quality factor Q of 1,000 in air.

12. The actuation device according to claim 10, characterized in that it is encapsulated in said layer of dielectric material.

13. The device according to claim 10, characterized in that said layer of dielectric material is hydrophobic.

14. The device according to claim 10, characterized in that said layer of dielectric material has a thickness greater than or equal to 100 nm and less than or equal to 40 μm.

* * * * *